(12) United States Patent
Han

(10) Patent No.: US 10,845,226 B2
(45) Date of Patent: Nov. 24, 2020

(54) ADHESIVE FLOW METER

(71) Applicant: Trane International Inc., Davidson, NC (US)

(72) Inventor: Dong Hyouck Han, Tyler, TX (US)

(73) Assignee: Trane International Inc., Davidson, NC (US)

(*) Notice: Subject to any disclaimer, the term of this patent is extended or adjusted under 35 U.S.C. 154(b) by 165 days.

(21) Appl. No.: 15/493,673

(22) Filed: Apr. 21, 2017

(65) Prior Publication Data
US 2018/0306618 A1    Oct. 25, 2018

(51) Int. Cl.
| | | |
|---|---|---|
| G01F 1/684 | (2006.01) | |
| G01F 1/698 | (2006.01) | |
| G01F 1/688 | (2006.01) | |

(52) U.S. Cl.
CPC .............. *G01F 1/684* (2013.01); *G01F 1/688* (2013.01); *G01F 1/6847* (2013.01); *G01F 1/6986* (2013.01)

(58) Field of Classification Search
CPC ........ G01F 1/684; G01F 1/6847; G01F 1/688; G01F 1/69; G01F 1/696; B60H 1/00792; B60H 1/3229; B60H 2001/3239; B60H 2001/3242; F25B 2700/13
USPC .............. 73/204.11, 204.14, 204.17, 204.23, 73/204.25
See application file for complete search history.

(56) References Cited

U.S. PATENT DOCUMENTS

| | | | |
|---|---|---|---|
| 3,335,606 A | 8/1967 | Scarpa | |
| 3,592,055 A * | 7/1971 | Dorman | G01F 1/69 |
| | | | 73/170.16 |
| 3,938,384 A * | 2/1976 | Blair | G01F 1/6847 |
| | | | 73/204.22 |
| 4,255,968 A | 3/1981 | Harpster | |
| (Continued) | | | |

FOREIGN PATENT DOCUMENTS

JP             10038652 A  *  2/1998  .............. G01F 1/68

OTHER PUBLICATIONS

"What is volume flow rate?"—https://www.khanacademy.org/science/physics/fluids/fluid-dynamics/a/what-is-volume-flow-rate.*
(Continued)

*Primary Examiner* — Benjamin R Schmitt
(74) *Attorney, Agent, or Firm* — The Salerno Law Firm, P.C.

(57) ABSTRACT

Methods and apparatus for non-intrusively measuring fluid flow in a conduit, such as a pipe or tubing. The apparatus includes an insulator having self-adhesive inner surface attachable to the conduit, a temperature sensor on the inner surface of the insulator that senses the conduit surface temperature, a heat source on the inner surface of the insulator that imparts heat into the conduit, and a microcontroller connected to the heat source activator and the sensor assembly. In one embodiment, a baseline conduit temperature is measured, and the heat source raises the temperature of the conduit by a predetermined amount. When the conduit reaches target temperature, the heat source is deactivated and the cooling time for the conduit to return to its baseline temperature is measured. Fluid flow rate is determined from the cooling time, the temperature rise within a predetermined time, a temperature drop within a predetermined time, and/or a temperature gradient over time.

15 Claims, 10 Drawing Sheets

(56) References Cited

U.S. PATENT DOCUMENTS

| | | | | |
|---|---|---|---|---|
| 4,821,568 A | * | 4/1989 | Kiske | A61B 5/0878 |
| | | | | 340/606 |
| 4,885,938 A | * | 12/1989 | Higashi | G01F 1/684 |
| | | | | 73/204.18 |
| 5,764,539 A | * | 6/1998 | Rani | A61M 5/16886 |
| | | | | 702/100 |
| 6,234,016 B1 | | 5/2001 | Bonne et al. | |
| 6,386,050 B1 | | 5/2002 | Yin et al. | |
| 6,550,325 B1 | * | 4/2003 | Inushima | G01F 1/688 |
| | | | | 338/22 SD |
| 6,725,716 B1 | | 4/2004 | Kawai et al. | |
| 7,243,538 B1 | | 7/2007 | Ramsesh | |
| 9,021,819 B2 | | 5/2015 | Kates | |
| 9,023,136 B2 | | 5/2015 | Kates | |
| 9,081,394 B2 | | 7/2015 | Kates | |
| 9,086,704 B2 | | 7/2015 | Kates | |
| 2004/0139799 A1 | * | 7/2004 | Sudolcan | G01F 1/696 |
| | | | | 73/204.17 |
| 2009/0025473 A1 | | 1/2009 | Imai et al. | |
| 2012/0180877 A1 | * | 7/2012 | Pallais | G01M 3/002 |
| | | | | 137/487.5 |

OTHER PUBLICATIONS

Micro Motion® Model D, DT, and DL Sensor Multi Language Installation Instructions, P/N 20000174 Rev. A, Micro Motion Inc. USA and Emerson Process Management, Mar. 2003.

\* cited by examiner

ADHESIVE FLOW METER

BACKGROUND

1. Technical Field

The present disclosure relates generally to flow measurement devices, and more particularly, to a non-intrusive flow meter that can be utilized without any modification to an existing pipe.

2. Background of Related Art

Flow meters are used in a wide range of industrial and consumer applications to measure fluid flow though a conduit, such as a pipe. A variety of flow metering techniques are known, such as mechanical-type meters which use the moving fluid mass to impart motion to an impeller, paddle, gear arrangement, or other member from which a flow measurement is derived. Other types of flow meters include pressure-based devices employing Bernoulli's principle, optical and laser-based flow, ultrasonic Doppler-based meters, thermal transit time meters, magnetic flow meters in which a magnetic field is applied to the moving fluid to generate a voltage proportional to the flow velocity, and vibration-based devices which employ the Coriolis effect. Many of these are complex, high-precision devices and therefore costly.

Moreover, measuring flow rate inside an existing pipe without modification to the pipe is exceedingly challenging. A flow metering device that overcomes these drawbacks in a reliable and cost-effective manner would be a welcome advance in the art.

SUMMARY

In one aspect of the present disclosure, a method for non-intrusively determining fluid flow in a conduit is disclosed. In an embodiment, the method includes sensing a first temperature of an exterior surface of the conduit, changing the temperature of the exterior surface of the conduit to a second temperature, measuring the time required for the exterior surface of the conduit to return to the first temperature from the second temperature, and determining fluid flow based at least in part upon the time.

In some embodiments, changing the temperature of the exterior surface of the conduit includes increasing the temperature of the exterior surface of the conduit.

In some embodiments, determining fluid flow includes multiplying the time by a predetermined coefficient.

In some embodiments, sensing a first temperature of an exterior surface of the conduit includes determining that the temperature of an exterior surface of the conduit has fallen within a predetermined temperature range for at least a predetermined period of time.

In some embodiments, sensing a first temperature of an exterior surface of the conduit includes determining that the temperature of an exterior surface of the conduit has not changed by more than a predetermined amount for at least a predetermined period of time.

In some embodiments, the method includes thermally insulating the exterior surface of the conduit from an ambient environment.

In some embodiments, the determining is performed in accordance with the formula $$Q = k \frac{1}{t_2 - t_1}.$$

In another aspect of the present disclosure, a method for non-intrusively determining fluid flow in a conduit is disclosed. In an embodiment, the method includes sensing a baseline temperature of an exterior surface of the conduit, heating the exterior surface of the conduit for a predetermined period of time, sensing a post-heating temperature of an exterior surface of the conduit, and determining fluid flow based at least in part upon the difference between the post-heating temperature and the baseline temperature.

In some embodiments, determining fluid flow includes multiplying the difference between the post-heating temperature and the baseline temperature by a predetermined coefficient.

In some embodiments, sensing a baseline temperature of an exterior surface of the conduit includes determining that the temperature of an exterior surface of the conduit has fallen within a predetermined temperature range for at least a predetermined period of time.

In some embodiments, sensing a baseline temperature of an exterior surface of the conduit includes determining that the temperature of an exterior surface of the conduit has not changed by more than a predetermined amount for at least a predetermined period of time.

In some embodiments, the method includes thermally insulating the exterior surface of the conduit from an ambient environment.

In some embodiments, the determining is performed in accordance with the formula $$Q = k \frac{1}{\Delta T}.$$

In another aspect of the present disclosure, an apparatus for non-intrusively determining a fluid flow rate within a conduit is disclosed. In one embodiment, the apparatus includes an insulator having an inner surface configured for attachment to the conduit, a temperature sensor disposed on the inner surface of the insulator and configured for sensing a temperature of the conduit, a heat source disposed on the inner surface of the insulator and configured for imparting heat into the conduit, and a microcontroller in operative communication with the heat source activator and the sensor assembly.

In some embodiments, the microcontroller is configured to measure a baseline temperature of the conduit, activate the heat source to raise the temperature of the conduit by a predetermined amount, deactivate the heat source, measure the cooling time for the conduit to cool to its original temperature, and determine the fluid flow rate within the conduit from the cooling time.

In some embodiments, the microcontroller is configured to measure a baseline temperature of the conduit, activate the heat source to raise the temperature of the conduit for a predetermined amount of time, deactivate the heat source, measure the raised temperature of the conduit, and determine the fluid flow rate within the conduit from the difference between the baseline temperature and the raised temperature.

In some embodiments, the heat source is formed from resistance wire.

In some embodiments, the apparatus include an electronic switch in communication with the microcontroller and configured to selectively activate the heat source.

In some embodiments, the apparatus includes an adhesive coating on the inner surface of the insulator.

In some embodiments, the insulator is formed from material selected from the group consisting of polyethylene foam and glass wool.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the drawings wherein.

Figure 1:
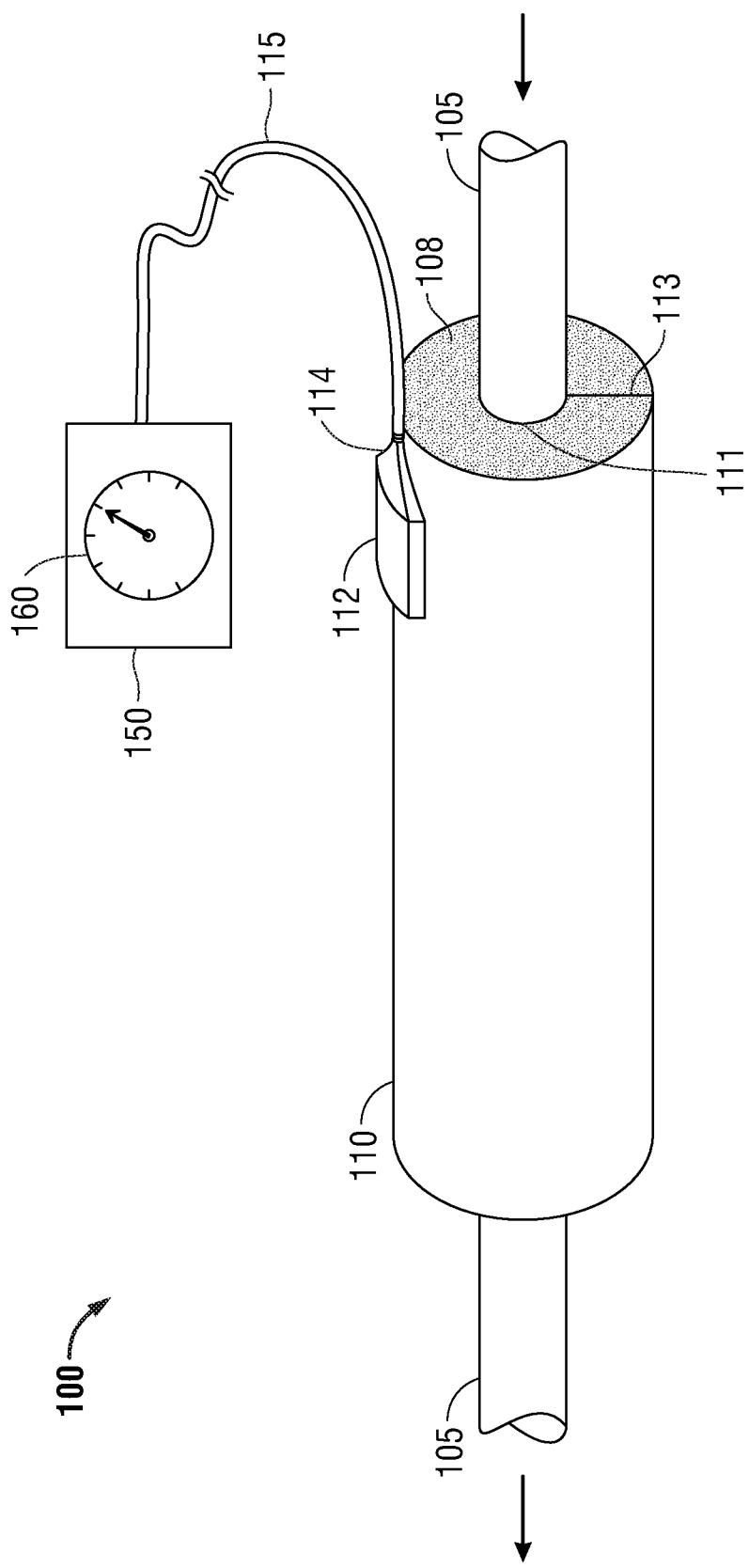
FIG. 1 is a perspective view of a flow meter in accordance with an embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and examples for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. It should be understood that the steps recited herein may be executed in any order and are not limited to the order presented. Moreover, two or more steps or actions recited herein may be performed concurrently.

Figure 2:
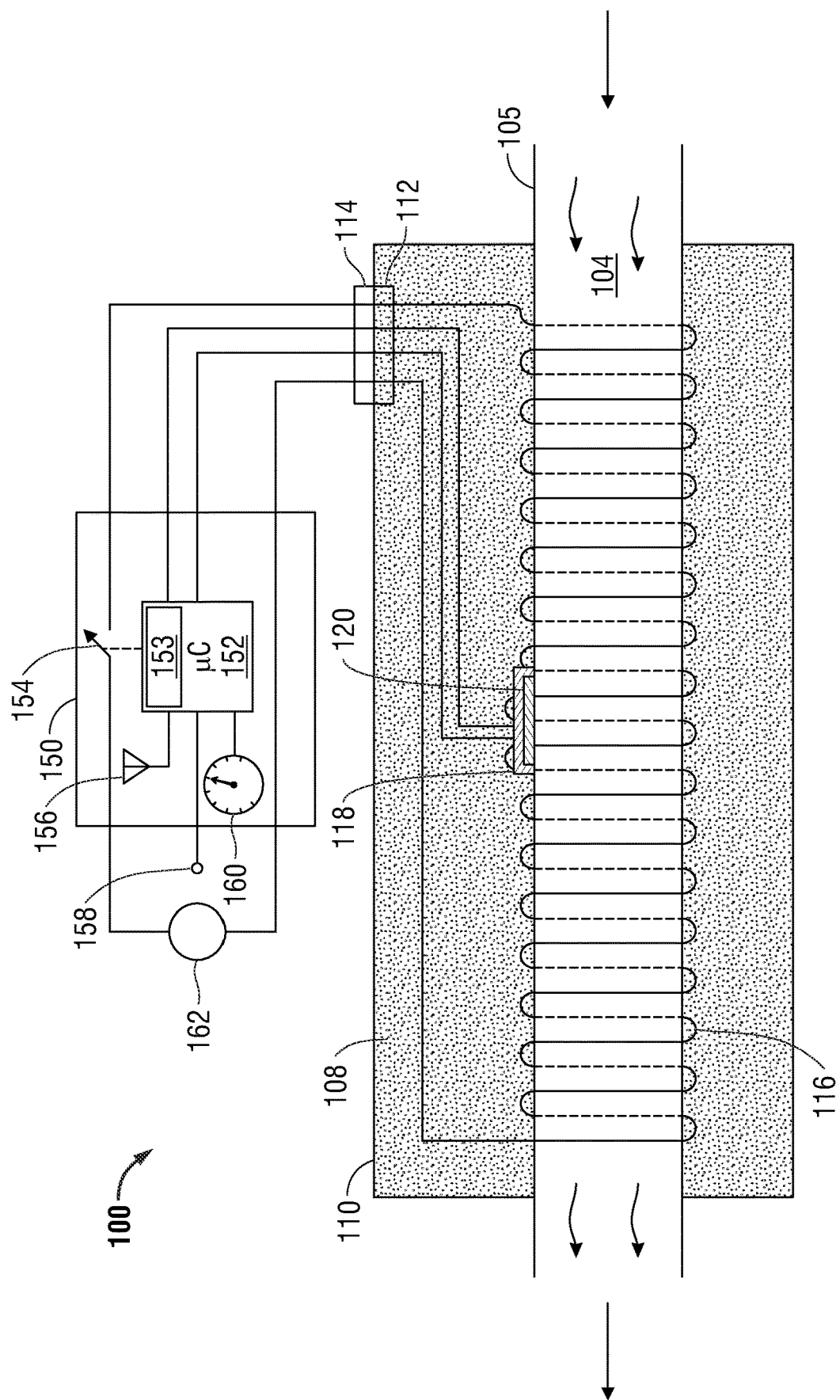
FIG. 2 is a schematic view of a flow meter in accordance with an embodiment of the present disclosure.
Figure 3:
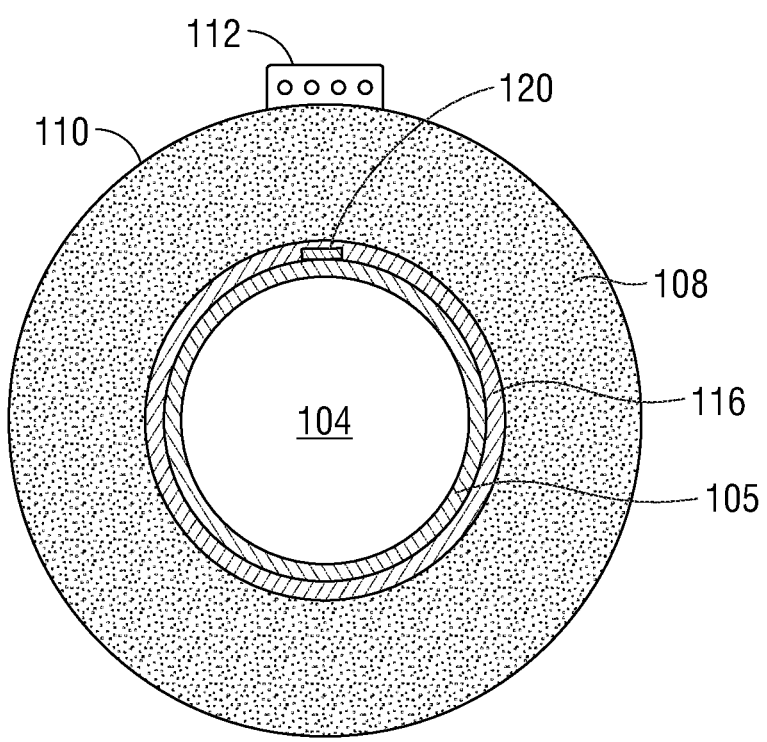
FIG. 3 is a transverse cross-section of a flow meter in accordance with an embodiment of the present disclosure.

FIGS. 1-3 illustrate a non-intrusive flow meter 100 in accordance with an exemplary embodiment of the present disclosure. Flow meter 100 includes a sensor assembly 110 having a temperature sensor 120, a heat source 116, and an insulator 108. Temperature sensor 120 is disposed between insulator 108 and an outer surface of pipe 105 to sense a temperature of the outer surface of pipe 105. Temperature sensor 120 may be a contact device (e.g., disposed in contact with pipe 105), such as a thermocouple, thermistor, a thin film resistance temperature detector (RTD), or a digital temperature sensor such as a ADT7420 digital temperature sensor chip manufactured by Analog Devices, Inc. of Norwood, Mass., USA. Alternatively, temperature sensor 120 may be a non-contact device, such as an infrared detector. In the present example embodiment, temperature sensor 120 is affixed to inner (e.g., pipe-facing) surface of insulator 108 to retain temperature sensor 120 in position, i.e., in contact with pipe 105.

Insulator 108 is generally cylindrical in shape and includes a bore 111 formed therethrough that is dimensioned to be mounted on pipe 105. Insulator 108 is formed from heat-resistant material suitable for thermal insulation, such as, without limitation, polyethylene foam or glass wool (fiberglass). A slit 113 running longitudinally and extending radially from bore 111 to an outer surface of insulator 108 allows flow meter 100 to be readily mounted onto an existing pipe. In alternative embodiments, flow meter 110 may be mounted onto pipe 105 by sliding onto an open end of pipe 105, or overmolded onto pipe 105 in a manufacturing step. Insulator 108 helps ensure that operation of flow meter 100 is not affected by ambient environmental conditions.

Sensor assembly 110 includes heat source 116 that is arranged to impart heat into pipe 105. In the example embodiments described herein, heat source 116 is formed from resistance heating wire, such as nichrome, preferably having an electrically-insulative, thermally-conductive jacket that facilitates the transmission of thermal energy from heat source 116 to pipe 105. Heat source 116 may be arranged in a generally helical fashion around pipe 105 to evenly distribute thermal energy along a length of sensor assembly 110, as depicted in FIG. 1. In other embodiments, such as in the example illustrated in FIG. 4A, a heat source 216 may be arranged in a serpentine-like pattern. In some embodiments, sensor assembly includes a thermal shield 118 disposed between heat source 116 and temperature sensor 120 to reduce or prevent temperature sensor 120 from being directly influenced by heat source 116.

In some embodiments, heat source 116 may be formed from tubing carrying a heated fluid, such as superheated refrigerant, coolant carrying waste heat, and the like. In some embodiments, where pipe 105 is formed from electrically conductive material, heat source 116 may include a pair of electrodes coupled to pipe 105 and spaced longitudinally from each other, to pass electrical heating current through pipe 105 which, in turn, imparts heat into pipe 105.

Flow meter 100 includes a controller 150 that configured to measure a temperature of pipe 105, activate heating element 116 to raise the temperature of pipe 105 by a predetermined amount, deactivate heating element 116, and measure the cooling time needed for pipe 105 to cool to its original temperature. The flow rate of fluid 104 flowing within pipe 105 is inversely proportional to the cooling time. In some embodiments, controller 150 is configured to activate heating element 116 to apply heat to pipe 105 for a predetermined period of time.

Electrical leads run from temperature sensor 120 and heating element 116 to connector 112 positioned on an external surface of sensor assembly 110. Controller 150 includes cable 115 having a connector 114 at an end thereof which mates with connector 112 to join sensor assembly 110 and controller 150 in operative engagement. This connection arrangement is exemplary, and any suitable means of electrical connection between sensor assembly 110 and controller 150 may be employed. For example, a connector may be additionally or alternatively be included with controller 150, sensor assembly 110 may have hardwired leads extending therefrom for attachment to controller 150 via a screw-type or spring-loaded terminal block, and so forth.

Controller 150 includes a microcontroller 152 (e.g., system on a chip or SoC) configured for operative engagement with temperature sensor 120 and heat source 116 of sensor assembly 110. Controller 150 includes a heat source activator 154 that is operated by microcontroller 152. In the present example embodiment, heat source activator 154 is an electronic switch such as a transistor, triac, solid state relay, or the like, to selectively supply power from a power source 162 to heat source 116. In other embodiments, for example, where heat source 116 is formed from tubing carrying a heated fluid, heat source activator 154 may be a solenoid-operated valve or the like to selectively supply heated fluid to heat source 116. In some embodiments, heat source 116 may include a silicone or polyimide flexible film heater.

Controller 150 includes one or more interface or display devices that communicate flow rate to a user and/or to a destination device such as an HVAC control circuit. In the example embodiment shown in FIG. 2, microcontroller 152 is coupled to a wireless communication interface 156, a wired communication interface 158, and a visual display 160. Wireless communication interface 156 enables the wireless transmission of flow rate data via any suitable wireless protocol, such as, without limitation, IEEE 802.15.4 (e.g., Z-Wave® or Zigbee®), IEEE 802.11 (WiFi), Bluetooth®, and so forth. Wired communication interface 158 may be configured to convey flow rate data using any suitable analog or digital protocol, for example, a proportional voltage output, pulse width modulated output, RS-485, USB, 1-Wire, I2C, and the like. Visual display 160 may include an analog gauge, digital display (e.g., a 7-segment type display), or a graphic screen. Controller 150 may include an audio output device such as a piezoelectric device or dynamic speaker to emit an alarm or speech output.

Controller 150 includes flow rate computation module 153 that includes a set of instructions executable on microcontroller 152 for performing a method of non-intrusive flow rate measurement as described herein. As will be familiar to one skilled in the art, microcontroller 152 includes a processor and a memory suitable for storing and executing a set of executable instructions included in flow rate computation module 153.

Controller 150 may optionally or alternatively be configured to transmit computed flow rate as well as raw data (e.g., real-time temperature sensor data, cooling times, etc.), and may be optionally be configured to receive input from a user and/or a connected destination device, such as measurement interval, temperature thresholds, calibration data, and the like. In some embodiments, controller 150 is configured to transmit identification information (serial number, firmware revision, user-defined label, etc.) and/or self-diagnostic information. In some embodiments, controller 150 is configured to receive alarm condition settings and to transmit an alarm when the alarm conditions are met.

Figure 4A:
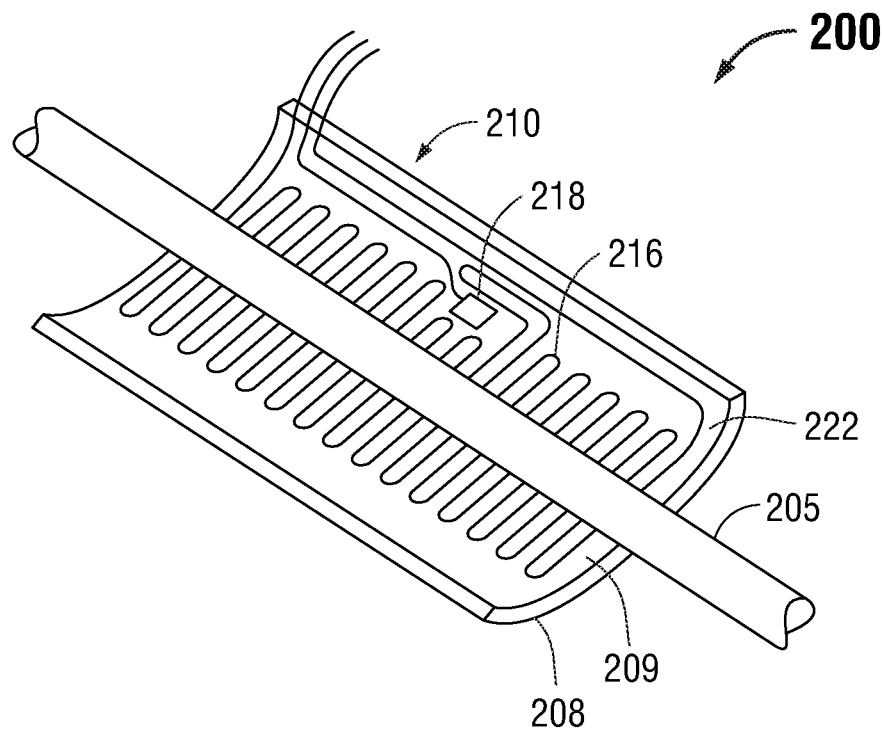
FIGS. 4A-4B illustrate non-intrusively mounting a flow meter onto a pipe in accordance with an embodiment of the present disclosure.
Figure 4B:
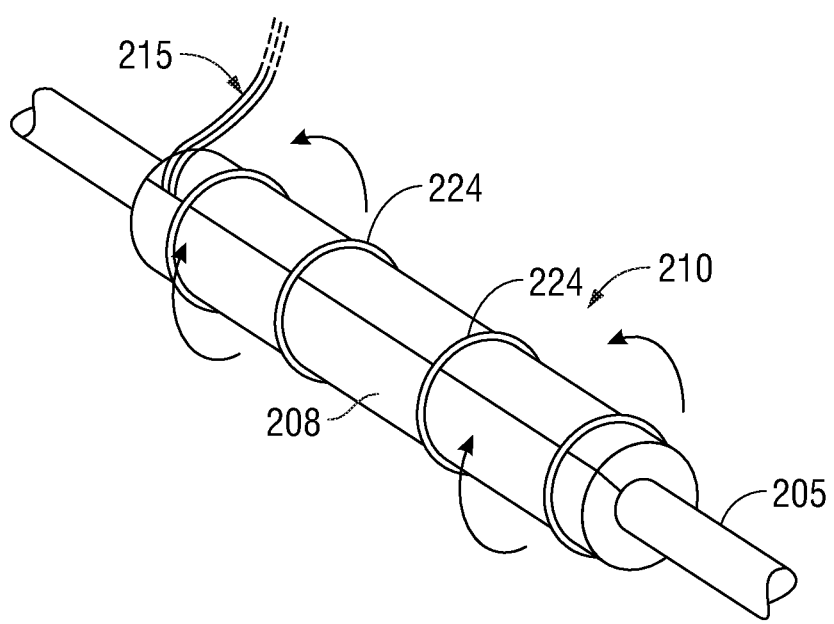

FIGS. 4A and 4B illustrate another embodiment of a flexible sensor assembly 210 configured for adhesive installation on an existing pipe 205. Flexible sensor assembly 210 includes an insulator 208 formed from a flexible and thermally-insulative material, such as polyethylene foam sheet. Temperature sensor 218 is fixed to a center portion of inner surface 209 of insulator 208, and heat source 216 is fixed to inner surface 209 in a serpentine fashion. In some embodiments, heat source 216 is arranged such that insulator 208 may be trimmed to size without interrupting continuity of heat source 216, such as in a lattice pattern. In some embodiments, heat source 216 may be a silicone or polyimide flexible film heater.

Inner surface 209 includes a self-adhesive coating 222. During installation, flexible sensor assembly 210 may be wrapped around pipe 205 and securely fixed in place by self-adhesive coating 222. Additionally or alternatively, flexible sensor assembly 210 may be held in place with one or more straps 224 which may be integrated into insulator 208 or separately provided. Straps 224 may employ adhesive strips, hook and loop fasteners, ratcheting-type straps, and so forth.

Figure 5:
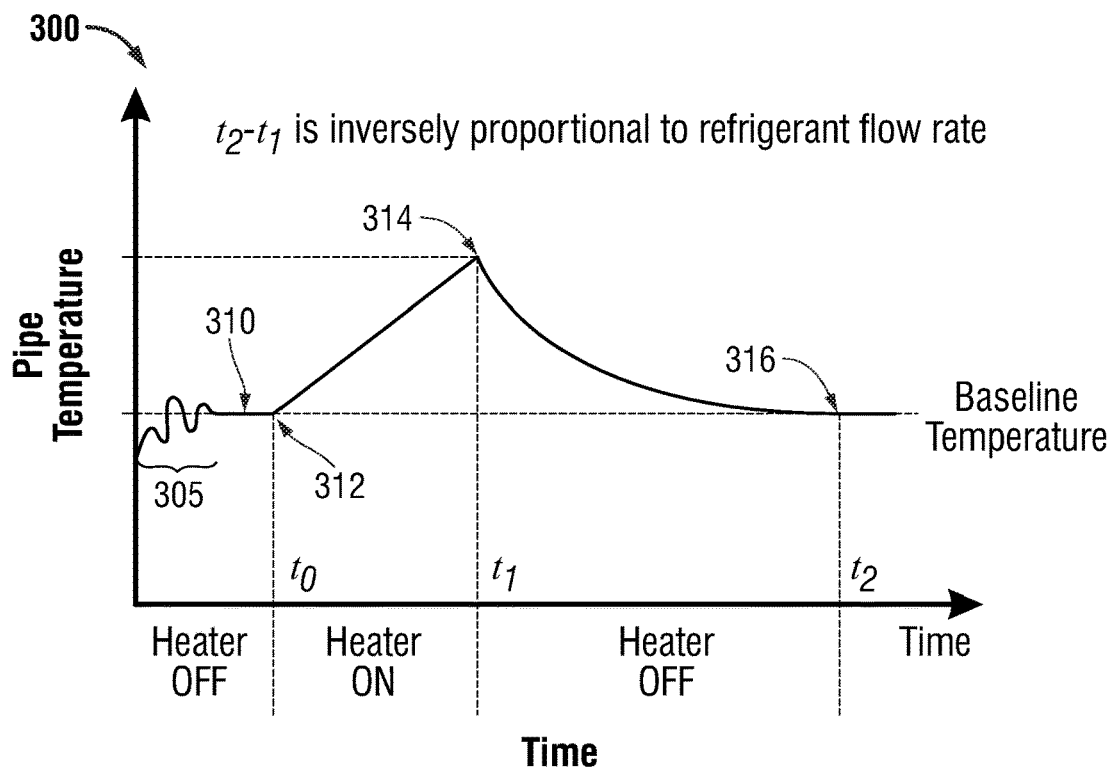
FIG. 5 is a graph illustrating flow measurement parameters in accordance with an embodiment of the present disclosure.

FIG. 5 is a graph 300 showing pipe temperature versus time to illustrate aspects of flow meter 100 in use. Initially, microcontroller 152 deactivates heat source activator 154 to place heat source 116 in an off state. The temperature of pipe 105 is sensed by temperature sensor 120 and monitored by microcontroller 150 during time period 305 to allow pipe temperature to stabilize until an accurate baseline temperature is observed at 310. At time $t_0$ (312), a flow sensing cycle begins when microcontroller 152 activates heat source activator 154 to supply power to heat source 116, which begins heating pipe 105. Heat source 116 remains activated and the temperature of pipe 105 continues to be monitored until the temperature reaches a predetermined threshold, for example, 10° C. above the baseline temperature (314). In some embodiments, heat source 116 remains activated for a predetermined period of time, for example, 60 seconds or 90 seconds.

At time $t_1$ (314), microcontroller 152 deactivates heat source activator 154 to place heat source 116 in an off state, and being measuring the cooling time needed for pipe 105 to cool to its original baseline temperature. As fluid 104 continues to flow within pipe 105, heat transfers from pipe 105 into fluid 104 causing the temperature of pipe 105 to cool. The rate of cooling is inversely proportional to the flow rate of fluid 104. A greater flow rate will cool pipe 105 more rapidly; a slower flow rate will cool pipe 105 more slowly. Advantageously, the operation of flow meter 100 is unaffected by flow direction. Fluid may flow in either direction within pipe 105.

At time $t_2$ (316), the temperature of pipe 105 has cooled to its baseline temperature. Microcontroller 152 computes the fluid flow in accordance with the formula $$Q = k \frac{1}{t_2 - t_1}$$

where Q represents flow rate, $t_2-t_1$ represents the cooling time required for pipe 105 to cool to its original baseline temperature, and k is an optional scaling constant. Scaling constant k may be selected based on the particular application in which flow meter 100 is employed, and may be determined empirically as required. In some embodiments, a predetermined temperature drop percentage as compared to the original baseline temperature can be used to shorten the measurement time. For example, if the temperature rise is 15° C., the time required to drop to 75% (0.75×15° C.=11.25° C.) can be used to determine flow rate. In this embodiment, pipe 105 does not need to cool completely down to the original baseline temperature, which speeds the measurement process.

Figure 6:
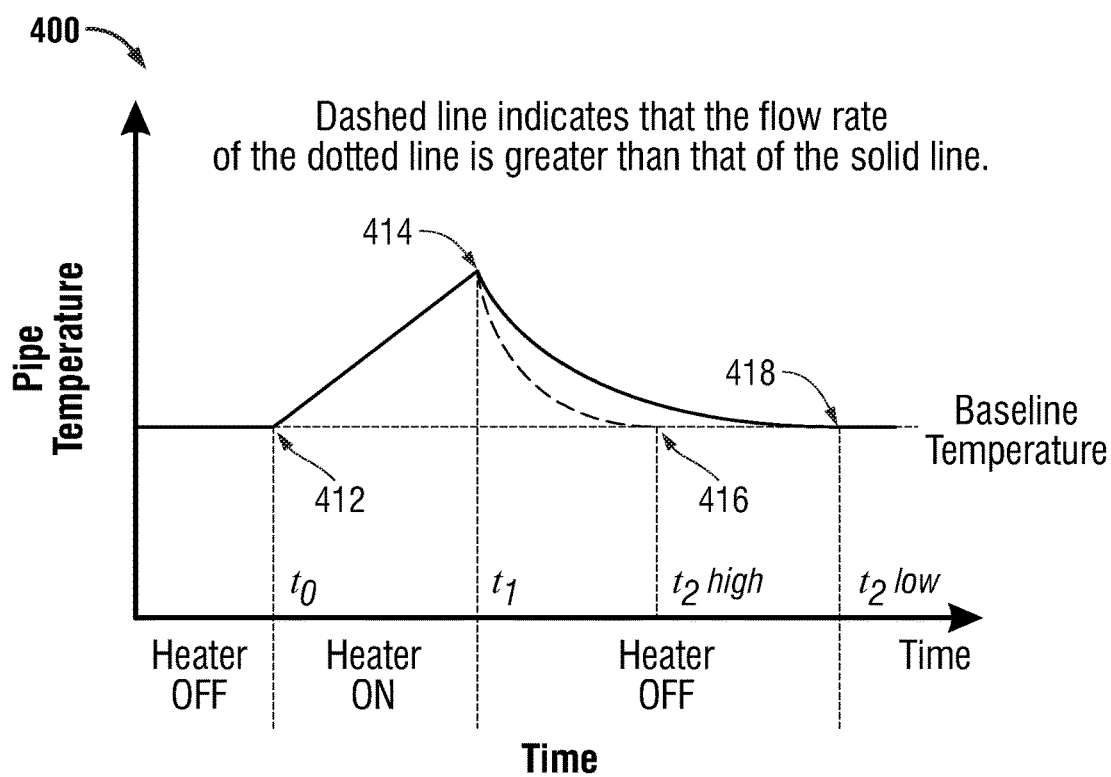
FIG. 6 is a graph illustrating comparative flow measurement parameters in accordance with an embodiment of the present disclosure.

FIG. 6 is a graph 400 illustrating a comparison between pipe temperature observed at a lower flow rate and pipe temperature observed at a higher flow rate. Heat is applied to the pipe at 412 and reaches the target temperature at 414. As shown by the solid line, the temperature of a pipe having a lower flow rate cools to its baseline temperature at time $t_2$low (418). The dashed line shows the temperature of a pipe having a higher flow rate reaching its baseline temperature at an earlier time $t_2$high (416).

Figure 7:
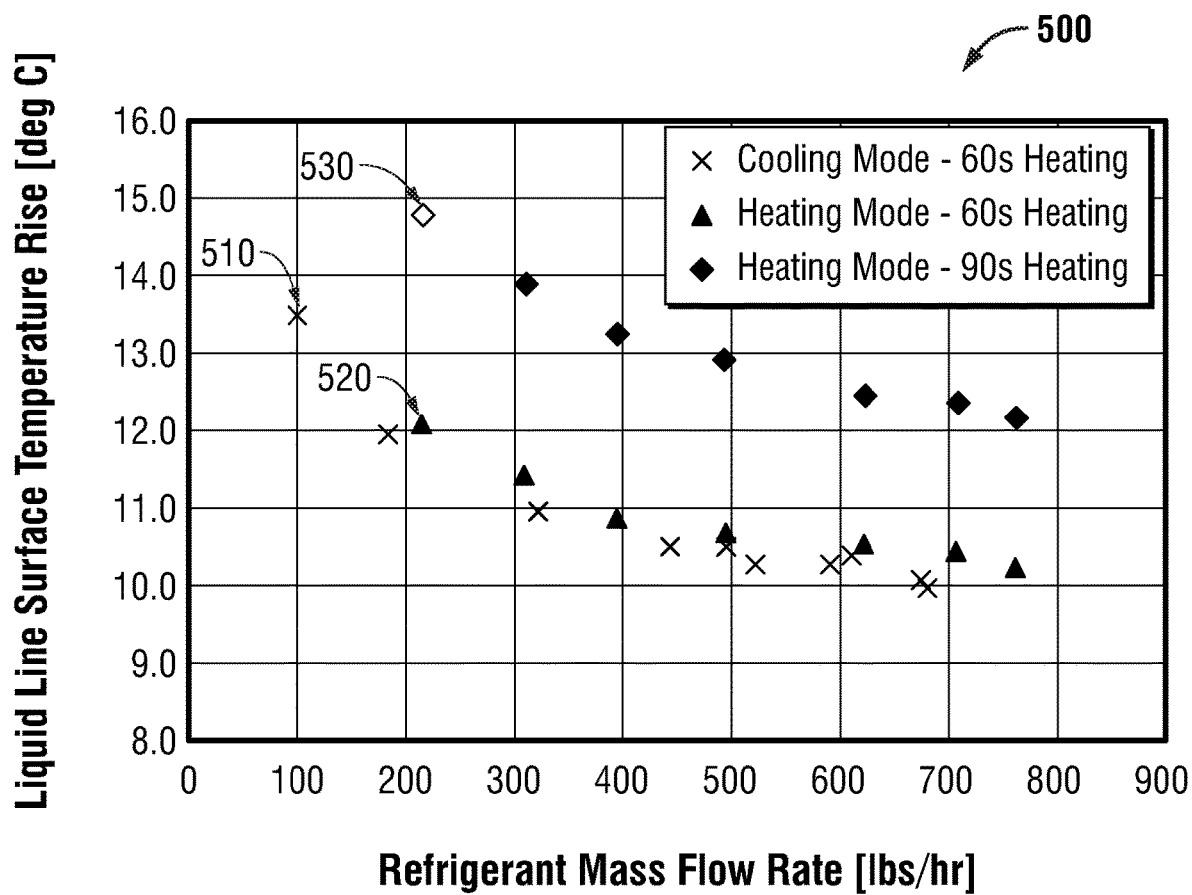
FIG. 7 is a scatter chart illustrating flow measurements performed in accordance with an embodiment of the present disclosure.

FIG. 7 is a graph 500 depicting aspects of an embodiment in accordance with the present disclosure wherein a baseline temperature of pipe 105 is taken, heat source 116 is activated for a predetermined heating time, and at the expiration of the heating time heat source 116 is deactivated and the resultant temperature of pipe 105 is taken. The flow rate of fluid 104 is determined from the temperature rise observed. Graph 500 illustrates a relationship between heating time, pipe temperature rise, and flow rate where flow meter 100 is affixed to a liquid refrigerant line of an HVAC system. For example, in a cooling mode where the HVAC system is operating as an air conditioner, heat source 116 is activated for 60 seconds and the temperature increase of pipe 105 is recorded to determine flow rate (510). In a heating mode where the HVAC system is operating as a heat pump, heat source 116 is activated for 60 seconds and the temperature increase of pipe 105 is recorded to determine flow rate (520). In another heating mode scenario, heat source 116 is activated for 90 seconds and the temperature increase of pipe 105 is recorded to determine flow rate (530). Microcontroller 152 may compute the flow rate from temperature increase using a look-up table determined by empirical evidence and/or in accordance with the formula $$Q = k \frac{1}{\Delta T}$$

where Q represents flow rate, ΔT represents the rise in temperature of pipe 105 from its original baseline temperature, and k is an optional scaling constant.

Figure 8:
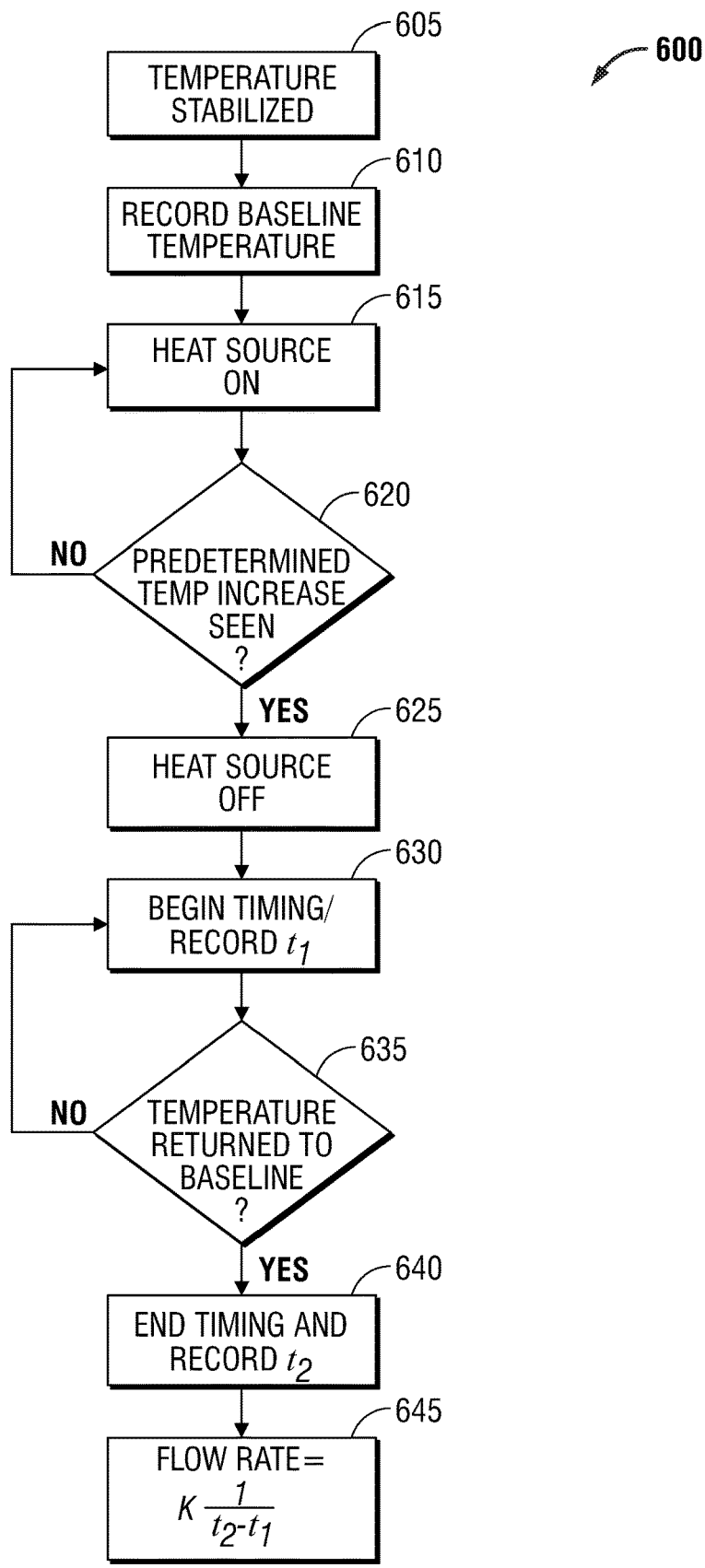
FIG. 8 is a flowchart illustrating a method of flow measurement in accordance with an embodiment of the present disclosure.

Turning now to FIG. 8, a method 600 of non-invasive flow measurement of fluid in a conduit according to an embodiment of the present disclosure is illustrated. The method begins in step 605 where the conduit surface temperature is allowed to stabilize. In some embodiments, the conduit surface temperature is considered to have stabilized if it remains within a predetermined range for at least a predetermined period of time, for example, within a range of 2° C. for at least one minute. Once the conduit surface temperature has stabilized, in the step 610 the conduit surface temperature is recorded as a baseline temperature. In the step 615, a heat source is activated to impart heat into the conduit. In the step 620, the conduit surface temperature is measured to determine whether a predetermined temperature increase has been achieved, e.g., a target temperature is reached. In some embodiments, the target temperature is 10° C. above the baseline temperature. If the target temperature is not reached, the heat source remains activated. Otherwise, if the conduit surface temperature reaches target temperature, in the step 625 the heat source is deactivated and in the step 630, a timing is initiated to determine the length of time needed for the conduit surface temperature to return to baseline temperature, e.g., the cooling period. This may be accomplished by, for example, recording a time $t_1$ at the start of the cooling period (e.g., when the heat source is deactivated), starting a timer, etc. In the step 635, if the baseline temperature is not yet reached, the timing continues. Otherwise, in the step 640, timing concludes and the duration of the cooling period is established. This may be accomplished by, for example, recording a time $t_2$ at the end of the cooling period (e.g., when the heat source is deactivated) and computing the difference between $t_2$ and $t_1$, stopping the timer and recording its value, etc. In the step 645, flow rate is computed in accordance with the formula $$Q = k \frac{1}{t_{cooling}}$$

where $t_{cooling}$ is the cooling period. In embodiments, the method iterates to step 605 to continue monitoring flow rate.

Figure 9:
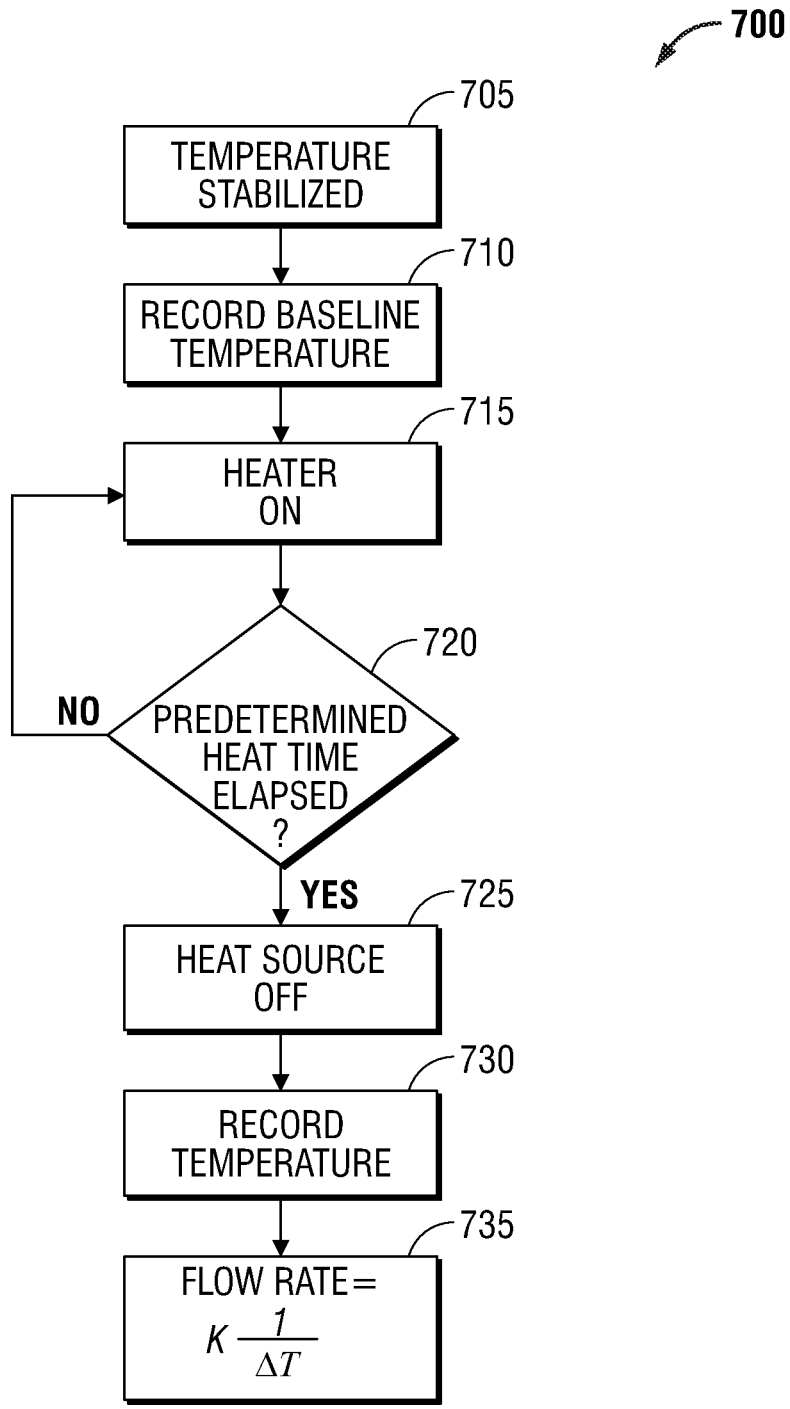
FIG. 9 is a flowchart illustrating a method of flow measurement in accordance with another embodiment of the present disclosure.

Turning now to FIG. 9, a method 700 of non-invasive flow measurement of fluid in a conduit according to another embodiment of the present disclosure is illustrated. The method begins in step 705 where the conduit surface temperature is allowed to stabilize. Once the conduit surface temperature has stabilized, in the step 710 the conduit surface temperature is recorded as a baseline temperature. In the step 715, a heat source is activated to impart heat into the conduit, and a timing begins. In the step 720, the heat source remains activated for a predetermined period of time, e.g., a heating time. In some embodiments, the heating time is 60 seconds or 90 seconds. At the expiration of the heating time, the heat source is deactivated in the step 725. In the step 730, the post-heating conduit surface temperature is recorded and the resultant change in conduit surface temperature is established as the difference between the post-heating temperature and baseline temperature. In the step 735, the flow rate is computed in accordance with the formula $$Q = k \frac{1}{\Delta T}$$

where ΔT represents the difference between the post-heating temperature and baseline temperature. In embodiments, the method iterates to step 705 to continue monitoring flow rate.

Figure 10:
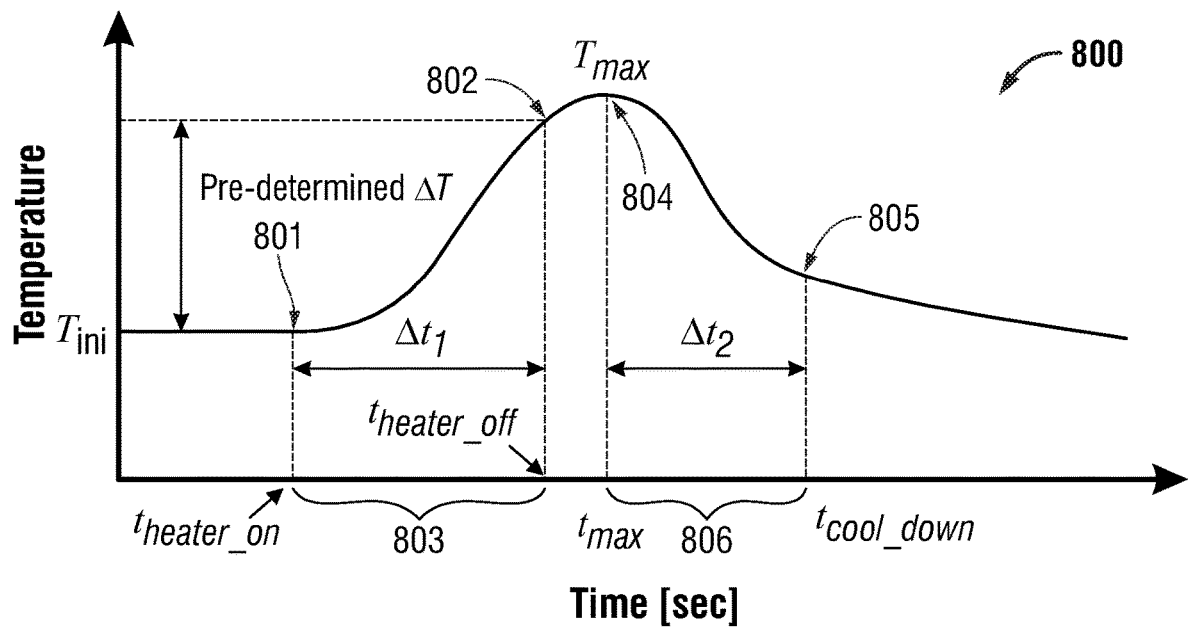
FIG. 10 is a graph illustrating flow measurement parameters in accordance with yet another embodiment of the present disclosure.

FIG. 10 is a graph 800 that illustrates yet other embodiments of the present disclosure that employs sloped-based methods of determining fluid flow. In one such embodiment, fluid flow is determined from the slope at which the maximum or the predetermined conduit temperature is reached from heater activation in accordance with the calculation $$\text{slope} = \frac{T_{max} - T_{ini}}{\Delta t_1}$$

where $T_{ini}$ is the initial temperature measured at time $t_{heater\_on}$ (801) on the conduit surface, $T_{max}$ is the peak temperature 802 measured on the conduit surface, and $\Delta_{t1}$ is the difference in time 803 between when the heater is activated 801 and when the predetermined temperature (802) or, alternatively, maximum temperature is reached.

Still referring to FIG. 10, another embodiment of a method of determining fluid flow includes measuring a time difference or slope for the conduit to cool down from a maximum temperature 804 to a pre-determined lower temperature 805 (e.g., 63.2% of maximum temperature) in accordance with the calculation $$\text{slope} = \frac{T_{max} - T_{cooldown}}{\Delta t_2}$$

where $T_{max}$ is the maximum temperature measured on the conduit surface, $T_{cool\_down}$ is the pre-determined lower target temperature measured on the conduit surface, and $\Delta_{t2}$ is the difference in time 806 between when the maximum temperature is reached 804 and the pre-determined lower target temperature 805 is reached.

Figure 11:
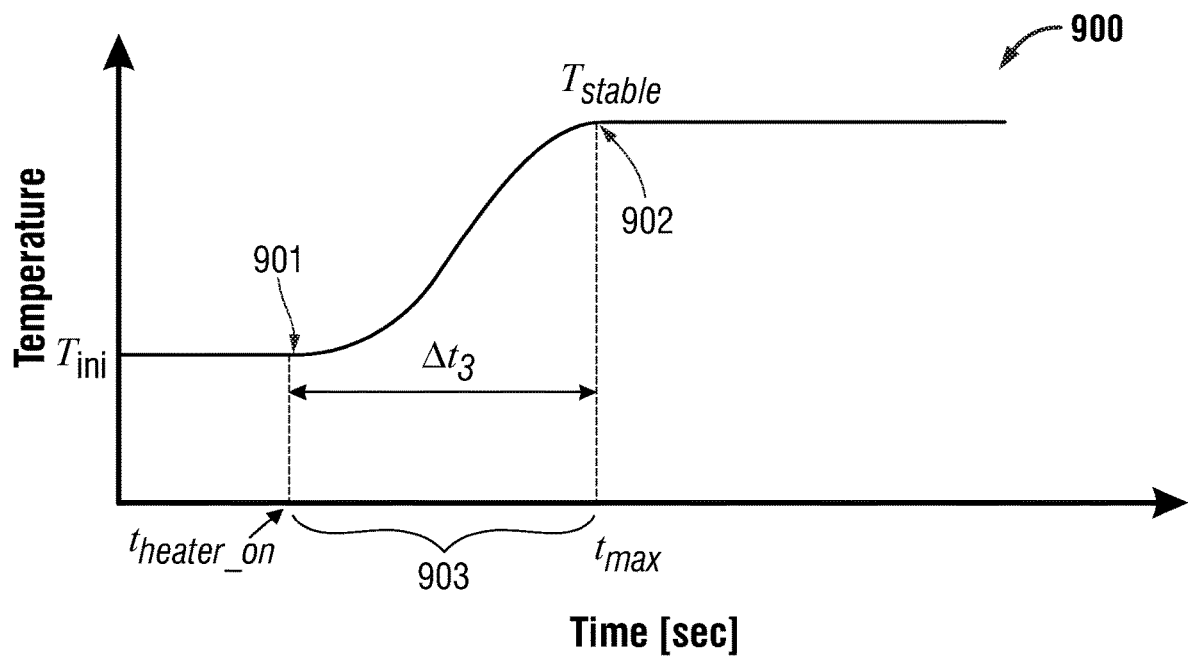
FIG. 11 is a graph illustrating flow measurement parameters in accordance with still another embodiment of the present disclosure.

FIG. 11 illustrates still another embodiment 900 of determining fluid flow in accordance with the present disclosure that includes measuring the required time or slope indicating that the conduit temperature has stabilized after the heater is turned on. In this embodiment, fluid flow is determined in accordance with the calculation $$\text{slope} = \frac{T_{stable} - T_{ini}}{\Delta t_3}$$

where $T_{ini}$ is the initial temperature measured on the conduit surface, $T_{stable}$ is the temperature at which the conduit stabilizes, and $\Delta t_3$ is the difference in time (903) between the heater activation time (901) and the time at which the stabilization is achieved (902).

Figure 12:
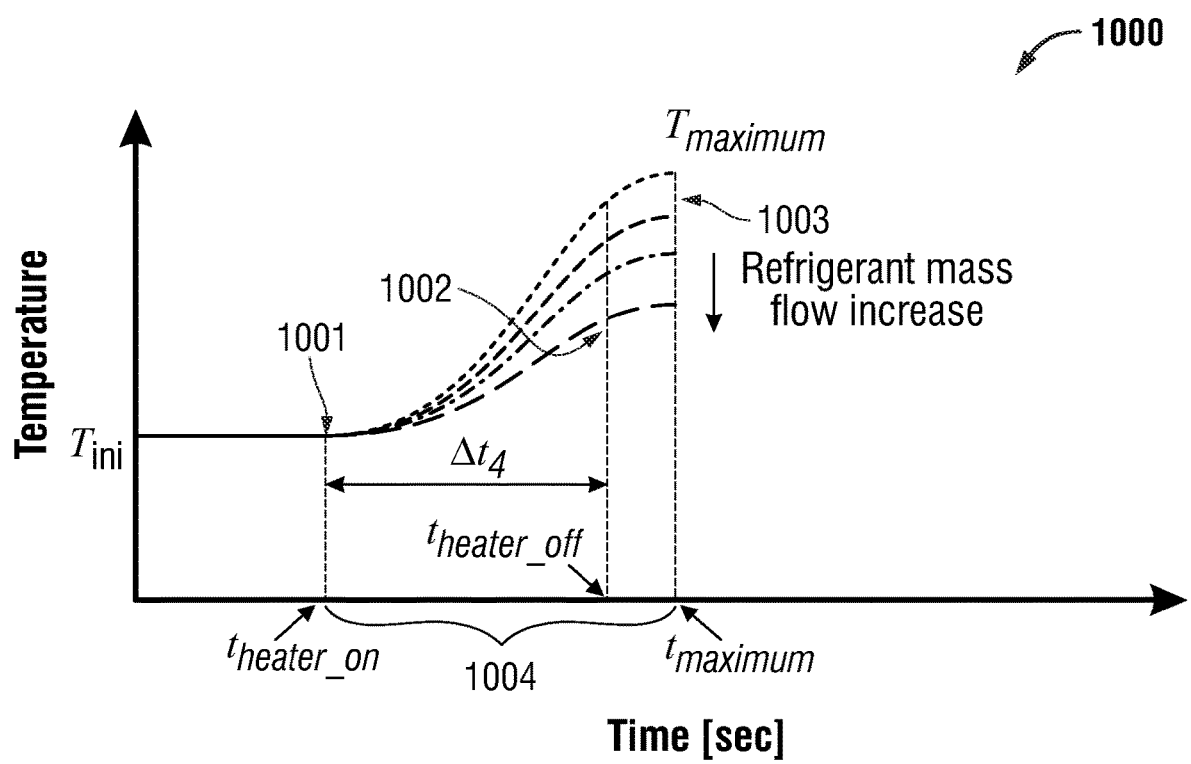
FIG. 12 is a graph illustrating flow measurement parameters in accordance with a further embodiment of the present disclosure.

FIG. 12 illustrates a further embodiment 1000 of determining fluid flow in accordance with the present disclosure that includes measuring the highest temperature or slope of conduit temperature seen after a fixed heating time. Note that, in this embodiment, conduit temperature may continue to rise after the heater is turned off. In this embodiment, fluid flow is determined in accordance with the calculation $$\text{slope} = \frac{T_{maximum} - T_{ini}}{\Delta t_4}$$

where $T_{ini}$ is the initial temperature 1001 measured on the conduit surface at the time the heater is activated ($t_{heater\_on}$), $T_{maximum}$ is the maximum temperature 1003 seen after the heater is deactivated (1002), and $\Delta t_4$ is the difference in time (1004) between the heater activation time $t_{heater\_on}$ (1001) and the time at which the maximum temperature is reached $t_{maximum}$ (1003).

ASPECTS

It is noted that any of aspects 1-20 may be combined with each other in any suitable combination.

Aspect 1. A method for non-intrusively determining fluid flow in a conduit, comprising sensing a first temperature of an exterior surface of the conduit, changing the temperature of the exterior surface of the conduit to a second temperature, measuring the time required for the exterior surface of the conduit to return to the first temperature from the second temperature, and determining fluid flow based at least in part upon the time.

Aspect 2. The method in accordance with aspect 1, wherein changing the temperature of the exterior surface of the conduit includes increasing the temperature of the exterior surface of the conduit.

Aspect 3. The method in accordance with aspect 1 or 2, wherein determining fluid flow includes multiplying the time by a predetermined coefficient.

Aspect 4. The method in accordance with any of aspects 1-3, wherein sensing a first temperature of an exterior surface of the conduit includes determining that the temperature of an exterior surface of the conduit has fallen within a predetermined temperature range for at least a predetermined period of time.

Aspect 5. The method in accordance with any of aspects 1-4, wherein sensing a first temperature of an exterior surface of the conduit includes determining that the temperature of an exterior surface of the conduit has not changed by more than a predetermined amount for at least a predetermined period of time.

Aspect 6. The method in accordance with any of aspects 1-5, further comprising thermally insulating the exterior surface of the conduit from an ambient environment.

Aspect 7. The method in accordance with any of aspects 1-6, wherein the determining is performed in accordance with the formula $$Q = k \frac{1}{t_2 - t_1}.$$

Aspect 8. A method for non-intrusively determining fluid flow in a conduit, comprising sensing a baseline temperature of an exterior surface of the conduit, heating the exterior surface of the conduit for a predetermined period of time, sensing a post-heating temperature of an exterior surface of the conduit, and determining fluid flow based at least in part upon the difference between the post-heating temperature and the baseline temperature.

Aspect 9. The method in accordance with aspect 8, wherein determining fluid flow includes multiplying the difference between the post-heating temperature and the baseline temperature by a predetermined coefficient.

Aspect 10. The method in accordance with aspect 8 or 9, wherein sensing a baseline temperature of an exterior surface of the conduit includes determining that the temperature of an exterior surface of the conduit has fallen within a predetermined temperature range for at least a predetermined period of time.

Aspect 11. The method in accordance with any of aspects 8-10, wherein sensing a baseline temperature of an exterior surface of the conduit includes determining that the temperature of an exterior surface of the conduit has not changed by more than a predetermined amount for at least a predetermined period of time.

Aspect 12. The method in accordance with any of aspects 8-11, further comprising thermally insulating the exterior surface of the conduit from an ambient environment.

Aspect 13. The method in accordance with any of aspects 8-12, wherein the determining is performed in accordance with the formula $$Q = k \frac{1}{\Delta T}.$$

Aspect 14. Apparatus for non-intrusively determining a fluid flow rate within a conduit, comprising an insulator having an inner surface configured for attachment to the conduit, a temperature sensor disposed on the inner surface of the insulator and configured for sensing a temperature of the conduit, a heat source disposed on the inner surface of the insulator and configured for imparting heat into the conduit, and a microcontroller in operative communication with the heat source activator and the sensor assembly.

Aspect 15. The apparatus in accordance with aspect 14, wherein the microcontroller is configured to measure a baseline temperature of the conduit, activate the heat source to raise the temperature of the conduit by a predetermined amount, deactivate the heat source, measure the cooling time for the conduit to cool to its original temperature, and determine the fluid flow rate within the conduit from the cooling time.

Aspect 16. The apparatus in accordance with aspects 14 or 15, wherein the microcontroller is configured to measure a baseline temperature of the conduit, activate the heat source to raise the temperature of the conduit for a predetermined amount of time, deactivate the heat source, measure the raised temperature of the conduit, and determine the fluid flow rate within the conduit from the difference between the baseline temperature and the raised temperature.

Aspect 17. The apparatus in accordance with any of aspects 14-16, wherein the heat source is formed from resistance wire.

Aspect 18. The apparatus in accordance with any of aspects 14-17, further comprising an electronic switch in communication with the microcontroller and configured to selectively activate the heat source.

Aspect 19. The apparatus in accordance with any of aspects 14-18, further comprising an adhesive coating on the inner surface of the insulator.

Aspect 20. The apparatus in accordance with any of aspects 14-19, wherein the insulator is formed from material selected from the group consisting of polyethylene foam and glass wool.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method for non-intrusively determining a fluid flow in a liquid refrigerant line of an HVAC system, comprising:
    attaching an adhesive sensor assembly to an exterior surface of the liquid refrigerant line, wherein the adhesive sensor assembly is configured to determine the fluid flow in a non-intrusive manner that does not modify an internal structure of the liquid refrigerant line;
    sensing a first temperature of the exterior surface of the liquid refrigerant line;
    changing a temperature of the exterior surface of the liquid refrigerant line to a second temperature;
    measuring a time for the exterior surface of the liquid refrigerant line to return to the first temperature from the second temperature; and
    determining the fluid flow in the liquid refrigerant line based at least in part upon the time.

2. The method in accordance with claim 1, wherein changing the temperature of the exterior surface of the liquid refrigerant line includes increasing the temperature of the exterior surface of the liquid refrigerant line.

3. The method in accordance with claim 1, wherein determining the fluid flow includes multiplying the time by a predetermined coefficient.

4. The method in accordance with claim 1, wherein sensing the first temperature of the exterior surface of the liquid refrigerant line includes determining that the temperature of the exterior surface of the liquid refrigerant line has fallen within a predetermined temperature range for at least a predetermined period of time.

5. The method in accordance with claim 1, wherein sensing the first temperature of the exterior surface of the liquid refrigerant line includes determining that the temperature of the exterior surface of the liquid refrigerant line has not changed by more than a predetermined amount for at least a predetermined period of time.

6. The method in accordance with claim 1, further comprising thermally insulating the exterior surface of the liquid refrigerant line from an ambient environment.

7. The method in accordance with claim 1, wherein determining is performed in accordance with the formula $$Q = k \frac{1}{t_2 - t_1}.$$

8. An apparatus for non-intrusively determining a fluid flow rate within a liquid refrigerant line of an HVAC system, comprising:
    an insulator having an inner surface comprising an adhesive configured for attachment to the liquid refrigerant line;
    a temperature sensor disposed on the inner surface of the insulator and configured for sensing a temperature of the liquid refrigerant line;
    a heat source disposed on the inner surface of the insulator and configured for imparting heat into the liquid refrigerant line; and
    a microcontroller in operative communication with the heat source activator and the temperature sensor, wherein microcontroller is configured to determine the fluid flow rate based on a temperature value determined from the sensing, and further configured to determine the fluid flow rate in a non-intrusive manner that does not expose the temperature sensor to the fluid.

9. The apparatus in accordance with claim 8, wherein microcontroller is configured to:
   measure a baseline temperature of the liquid refrigerant line;
   activate the heat source to raise the temperature of the conduit by a predetermined amount;
   deactivate the heat source;
   measure the cooling time for the liquid refrigerant line to cool to its original temperature; and
   determine the fluid flow rate within the conduit from the cooling time.

10. The apparatus in accordance with claim 8, wherein microcontroller is configured to:
   measure a baseline temperature of the conduit;
   activate the heat source to raise the temperature of the conduit for a predetermined amount of time;
   deactivate the heat source;
   measure the raised temperature of the conduit; and
   determine the fluid flow rate within the conduit from the difference between the baseline temperature and the raised temperature.

11. The apparatus in accordance with claim 8, wherein heat source is formed from resistance wire.

12. The apparatus in accordance with claim 8, further comprising an electronic switch in communication with the microcontroller and configured to selectively activate the heat source.

13. The apparatus in accordance with claim 8, further comprising an adhesive coating on the inner surface of the insulator.

14. The apparatus in accordance with claim 8, wherein insulator is formed from material selected from the group consisting of polyethylene foam and glass wool.

15. The apparatus in accordance with claim 8, wherein microcontroller determines the fluid flow rate in a manner that is independent of a direction of flow.

* * * * *